United States Patent [19]

Satran et al.

[11] Patent Number: 5,551,811
[45] Date of Patent: Sep. 3, 1996

[54] TOOL ASSEMBLY HAVING INTERFITTING MALE AND FEMALE COUPLING MEMBERS

[75] Inventors: Amir Satran, Kfar Havradim; Rafael Margulis, Karmiel, both of Israel

[73] Assignee: Iscar, Ltd., Migdal Tefen, Israel

[21] Appl. No.: 318,798

[22] PCT Filed: Feb. 17, 1994

[86] PCT No.: PCT/EP94/00452

§ 371 Date: Dec. 5, 1994

§ 102(e) Date: Dec. 5, 1994

[87] PCT Pub. No.: WO94/19132

PCT Pub. Date: Sep. 1, 1994

[30] Foreign Application Priority Data

Feb. 18, 1993 [IL] Israel ........................................ 104774

[51] Int. Cl.⁶ .................................................... B23C 5/26
[52] U.S. Cl. .................................................... 407/40
[58] Field of Search ............................... 407/40, 46–48; 408/230, 231, 233, 239; 82/158; 409/234; 279/8; 403/350, 361

[56] References Cited

U.S. PATENT DOCUMENTS

| | | |
|---|---|---|
| 2,844,947 | 7/1958 | Shipley . |
| 3,584,667 | 6/1971 | Reiland . |
| 4,073,160 | 2/1978 | Perret . |
| 4,701,994 | 10/1987 | Noh et al. . |
| 4,834,597 | 5/1989 | Andersson et al. . |
| 4,934,883 | 6/1990 | Andersson et al. . |
| 5,083,887 | 1/1992 | Dotany . |

FOREIGN PATENT DOCUMENTS

| | | |
|---|---|---|
| 2103071 | 12/1992 | Canada . |
| 1558932 | 1/1980 | United Kingdom . |

*Primary Examiner*—M. Rachuba
*Assistant Examiner*—Kenneth J. Hansen
*Attorney, Agent, or Firm*—Pennie & Edmonds

[57] ABSTRACT

A tool assembly comprising two components, adapted to be coaxially coupled together, is disclosed. The components share a common longitudinal axis so that a motion drive transmitted to the first of the two is transmitted to the second. The components are formed with interfitting male and female coupling members, each coupling member being formed with at least two terminal lobe portions and central, symmetrically disposed portion inset with respect to its associated lobe portions. The central and lobe portions of the male coupling member mate with the central and lobe portions of the female coupling member, forming a mating pair of lobe portions. The coupling members are formed, adjacent each mating pair of lobe portions, with respective surfaces, at least one of which is curved. Upon relative rotational displacement of the components about the common axis, at least one pair of surfaces abuts in such a manner that an angle defined between a tangent to the curved surface at the point of contact and a radius extending from the common axis to the point of contact lies substantially between −10° and +25°.

10 Claims, 6 Drawing Sheets

TOOL ASSEMBLY HAVING INTERFITTING MALE AND FEMALE COUPLING MEMBERS

FIELD OF THE INVENTION

The present invention relates to a tool assembly, in particular to a multi-component tool assembly such as, for example, a rotary cutting tool assembly, of the kind comprising at least two components, e.g. a tool or an adapter for a tool and a holder, adapted to be coupled together.

BACKGROUND OF THE INVENTION

In such tool assemblies, particularly of the rotary kind, the two component members of the assembly are wedge-coupled together as a result of the torque generated during rotary machining operations. For this purpose, the component members of the assembly can be respectively formed with similarly shaped projections and recesses which are adapted to cooperate with each other so as to bring the component members into a clamping engagement. The coupling between the component members of the assembly has to be rigid enough to meet the reliability requirements, especially for hard machining conditions, as well as to provide accurate mutual coaxial alignment of the component members, with respect to each other and with respect to the central rotary axis and also to ensure absence of rotational clearance when rotary motion is transferred from a driving component member to a driven component member.

There are known tool assemblies such as are used in composite milling cutters, where the coupling of a replaceable front end or intermediate component to a basic holder is achieved by means of pins which protrude from the component to engage with corresponding recesses in the basic holder.

These assemblies are disadvantageous in view of the fact that to ensure reliable coupling many additional constructional elements are required.

In another known assembly disclosed in U.S. Pat. Nos. 4,834,597 and 4,934,883 and used with milling cutters and drilling tools, there are two component members, one of which is a tool or an adapter for a tool and the other is a holder having a recess adapted to receive a correspondingly-shaped projection of the first member. The cooperating surfaces of the recess and the projection have a non-circular cross-section with at least two radial extensions so that the component members of the assembly cannot rotate with respect to one another. The assembly further comprises means for relative clamping together of the members.

The disadvantage of this known assembly is that the actual regions of contact between the cooperating surfaces of the component members and therefore the distribution of the wedging forces generated during machining operations cannot be exactly predetermined as the contact between cooperating surfaces may take place anywhere along their peripheries. Thus, in order to provide a rigid coupling between the component members, an extended region of contact between to component members is needed. In consequence, and in order to ensure a maximum transference of torque, the projection must be so designed as to extend around the entire periphery of the driven member. Furthermore, the use of such an extended projection is very disadvantageous with rotary milling cutters in which are formed flutes, seeing that the presence of such flutes essentially limits the space available in which the projection can be accommodated.

It is an object of the present invention to provide a multi-component tool assembly, in which the above-referred-to disadvantages are substantially reduced or overcome.

SUMMARY OF THE INVENTION

According to the present invention, there is provided a tool assembly comprising first and second tool assembly components adapted to be coaxially coupled together so as to have a common longitudinal axis axed so that a motion drive transmitted to said first component is transmitted to the second component; said components being formed with interfitting male and female coupling members, each coupling member being formed with at least two terminal lobe portions and a central, symmetrically disposed portion which is inset with respect to its associated lobe portions, the central portion of the male coupling member mating within the central portion of the female coupling member whilst each lobe portion of the male coupling member mates within a lobe portion of the female coupling member so as to form a mating pair of lobe portions; said coupling members being formed, adjacent each mating pair of lobe portions and remote from said axis with respective pairs of surfaces of which at least one is curved so that, upon relative rotational displacement of said components about said common axis a point of contact is established between at least one pair of surfaces, such that an angle defined between a tangent to said curved surface at the point of contact and a radius extending from said common axis to said point of contact lies substantially between −10° and +25°.

Preferably, the tool assembly is a rotary assembly, with its common longitudinal axis also serving as a rotary axis, the tool components being coaxially coupled together so that a rotary drive transmitted to a first component is transmitted therefrom to the second component.

Preferably, the component surfaces of each of said pairs of surfaces are curved, nesting one within the other and having differing radii of curvature.

In accordance with a preferred embodiment, each coupling member comprises a plurality of substantially radially directed arms, each arm being formed integrally at one end thereof with one of said terminal lobe portions and, at the other end thereof, with said central portion. Preferably, the coupling members are symmetrically disposed with respect to their common axis.

BRIEF SUMMARY OF THE DRAWINGS

For a better understanding of the present invention, and to show how the same may be carried out in practice, reference will now be made to the accompanying drawings, in which.

DETAILED DESCRIPTION OF PREFERRED EMBODIMENT

Figure 1:
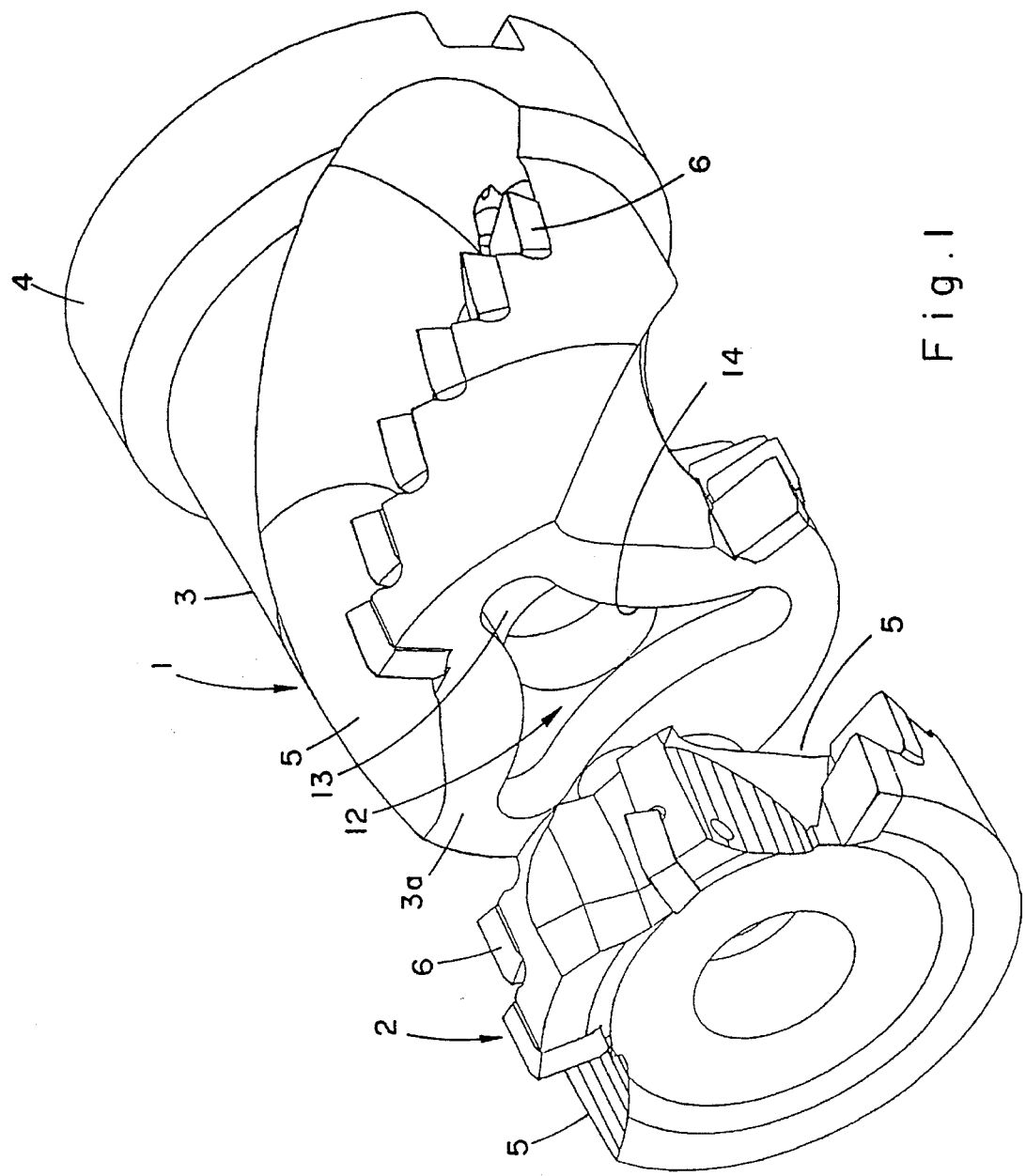
FIG. 1 is an exploded, perspective view of a rotary milling tool assembly in accordance with the present invention.
Figure 2:
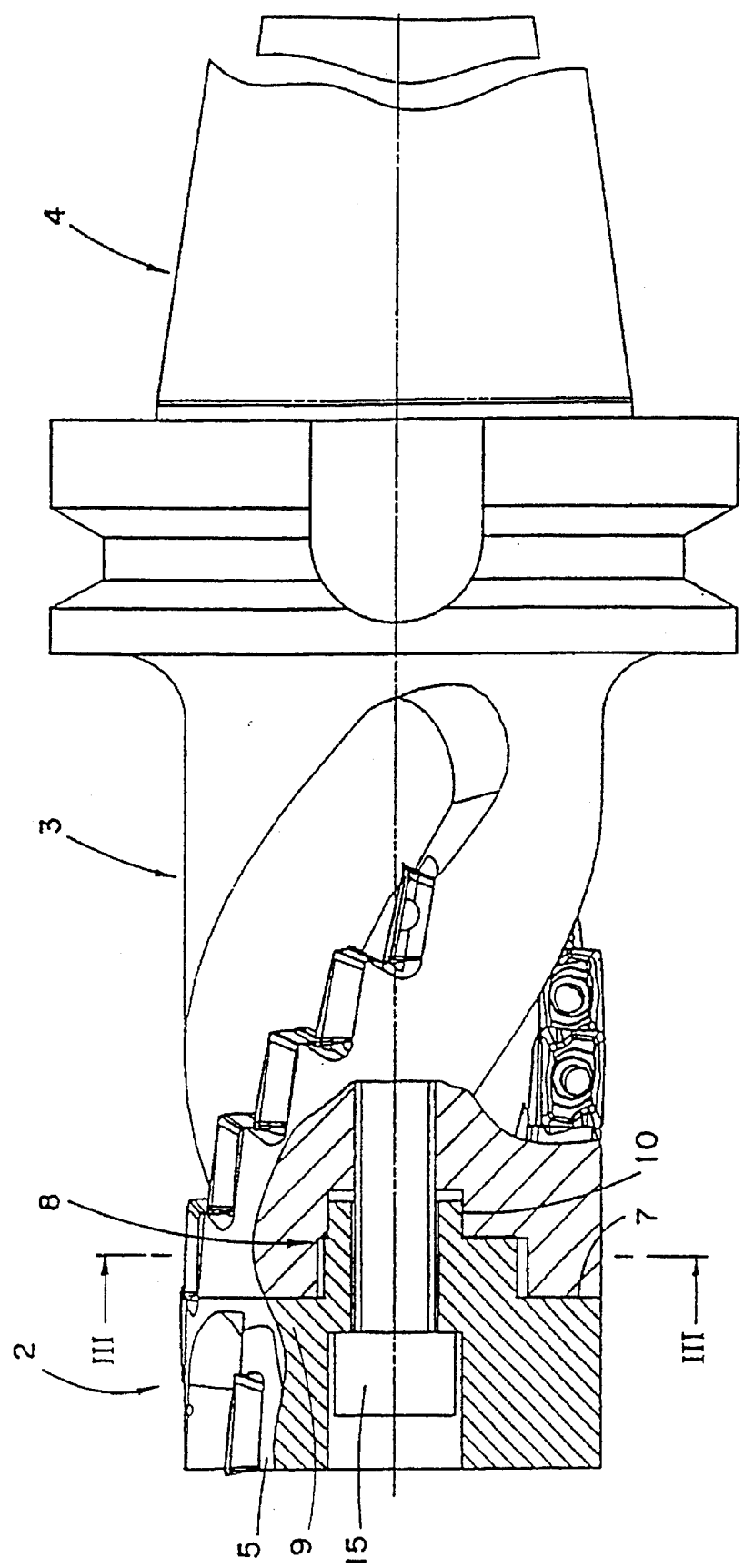
FIG. 2 is a partially sectioned side elevation of the tool assembly shown in FIG. 1, when assembled, together with an integrally formed tool holder shaft.

As seen in FIGS. 1 and 2 of the drawings, a rotary milling cutter 1 consists essentially of a front milling component 2, a central milling component 3. In FIG. 2 of the drawings, a tool holder shaft 4 is shown integral with the central component 3 for coupling to a machine tool drive spindle (not shown). Alternatively, as in the arrangement shown in FIG. 1 of the drawings, a separate toolholder shaft (not shown) can be appropriately coupled to the central component 3.

The front component 2 is formed with flutes 5 in which are mounted milling cutters 6. The central component 3 is formed with helically-directed flutes 5 adapted to constitute extensions of the flutes in the front component and in which are also seated successive rows of helically-disposed milling cutters 6, which define between them a cylindrical envelope.

The front component 2 is coupled to the central component 3 by means now to be described with reference to FIGS. 2 and 3 of the drawings.

As can be seen in FIG. 2, there depends centrally from a lower surface 7 of the front component 2 a stepped coupling and alignment member 8. The alignment and coupling member 8 comprises a male torque transmission coupling component 9 and, centrally depending therefrom, a cylindrical alignment member 10.

Figure 3:
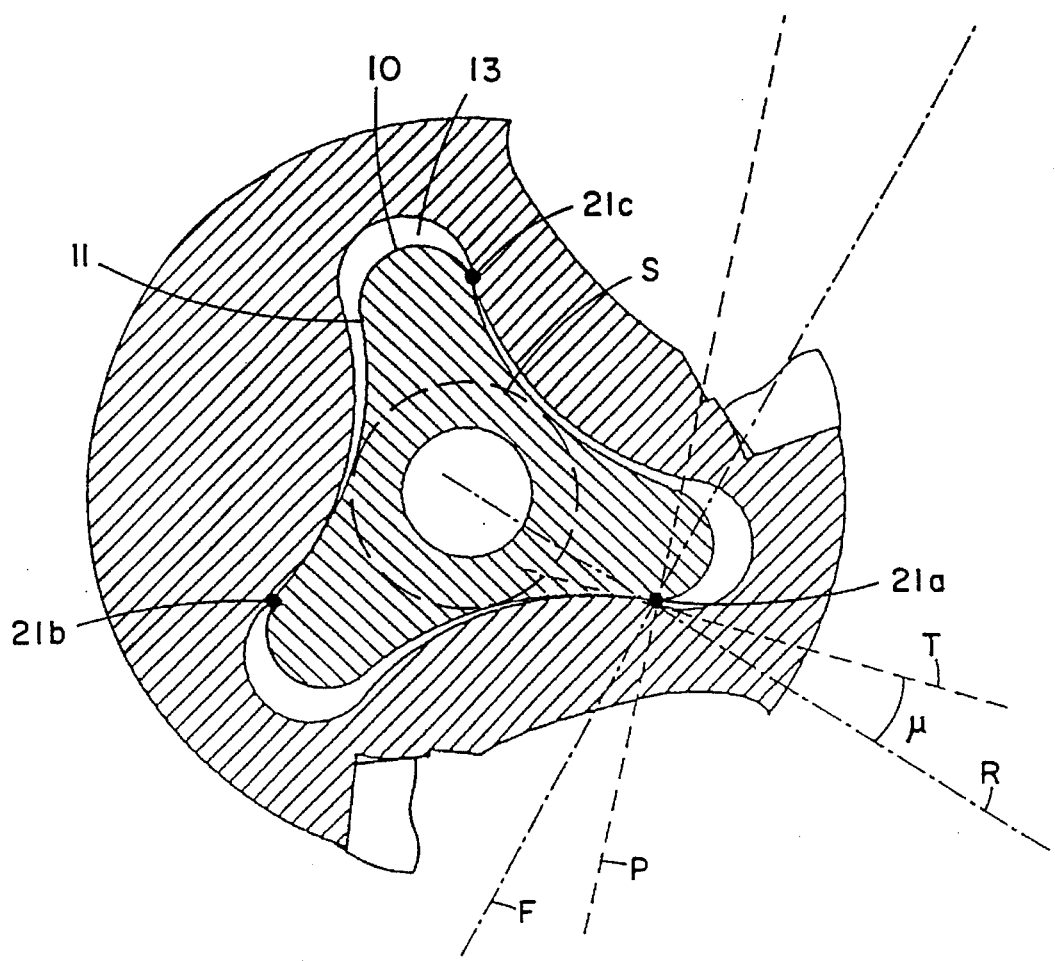
FIG. 3 is a cross-sectional view of the tool assembly shown in FIG. 2, taken along the line III:III.

As clearly seen in FIG. 3 of the drawings, the torque transmission coupling member 9 is of substantially triangular cross-sectional shape, having at its apexes terminal lobe portions 10 which are coupled with each other by cusp-shaped intermediate portions 11. The cross-sectional shape of the torque transmission coupling portion 9 thereby comprises the terminal lobe portions 10 and a central, symmetrically disposed portion defined by the cusps 11, which is effectively inset with respect to the associated lobe portions 10. As seen in FIGS. 1 and 3 of the drawings, there is formed, in an upper surface 3a of the central component 3, a female coupling component 12 constituted by a recess corresponding in shape to the cross-sectional shape of the torque-transmitting male component 9, and adapted to receive the latter. Thus, the female component 12 is also of basically triangular shape, having terminal lobe portions 13 coupled by cusp-like portions 14, the latter forming a central, symmetrically disposed portion inset with respect to its associated lobe portions 13.

The front 1 and central 2 portions are centrally and coaxially bored so as to receive a clamping screw 15, the lower end of which is screw fitted into a correspondingly tapped bore formed in the central component 3.

Thus, the front 1 and central 2 components are firmly coupled together by means of the clamping screw 15 with the lower end of the aligning portion 9 being spaced slightly from the upper end of a receiving bore formed in the central portion 3.

In this position, and as clearly seen in FIG. 3 of the drawings, three mating pairs of lobe portions 10, 13 are created, each pair consisting of a male 10 and negative 13 lobe portion and, adjacent each mating pair of lobe portions 10, 13, are to be found a pair of surfaces respectively of the male and female coupling components, such that there is established at least one initial point of contact 21 to be followed, upon relative rotation of the first component with respect to the second component, by subsequent point contacts 21b, 21c. In the example illustrated, these points of contact 21a, 21b, 21c are effected between adjacent curved surfaces of which, at the points of contact, one curved surface has a radius of curvature slightly greater than the other. At this point of contact, a common tangent T defines an angle μ with respect to a line R which passes through the axis of rotation of the tool and the point of contact 21a.

If now we consider the pressure vector P which is normal to the tangent T and passes through the point of contact 21a and the force vector F normal to the line R, it is clear that maximum turning torque is established when the vectors F and P coincide, i.e. when the angle μ=0.

In practice, however, the smaller the angle μ, the smaller the radius of an inscribed circle s which can be formed centrally within the male projection and this, in turn, carries with it an essential weakening of the radial arms terminating in the lobe portions 10 and effectively constituting the male projection. In practice, therefore, the dimensions of the male component 9 have to be optimized so as to allow for slightly greater inscribed circles, thereby increasing the strength of these radial arms, and this in turn leads to an increase in the magnitude of the angle μ. In practice, μ can range from −10° to +25°, whilst the optimal value of μ lies between 0° and 1°.

It will be seen that, in addition to ensuring the position of points of contact wherein these angles are achieved, the construction in accordance with the invention ensures that the points of contact are maximally displaced from the axis of rotation, thereby significantly increasing the transmitted torque.

Figure 4:
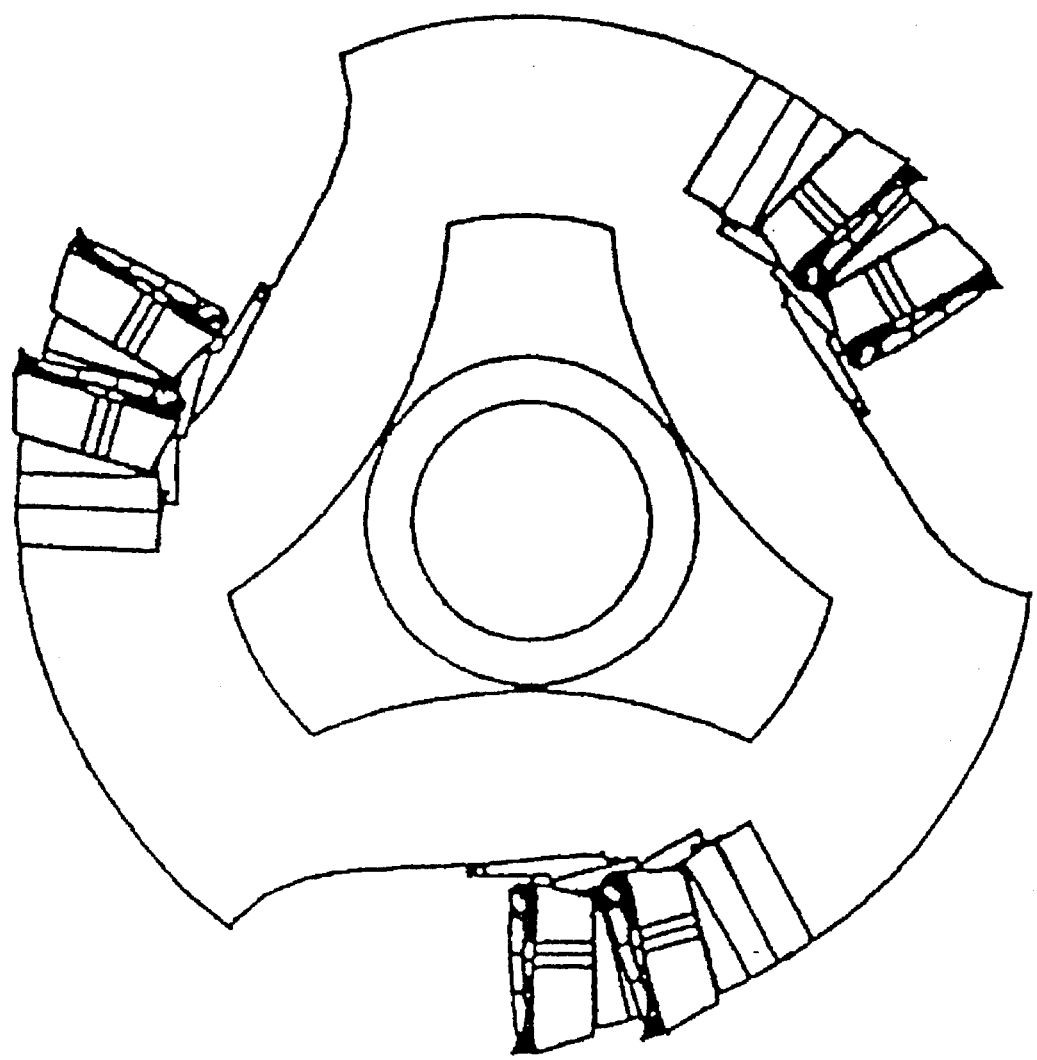
FIG. 4 is plan view from below of a first modified form of constituent component for a rotary tool assembly in accordance with the present invention.

Whilst in the arrangement shown in FIGS. 1, 2 and 3 of the drawings both the front and central components are shown as having two helically-disposed flutes with the terminal lobe portions extending into female lobe portions located in those regions of the central portion having a maximal external diameter, in the arrangement shown in FIG. 4 of the drawings the tool assembly is shown as having three flutes with the lobe pairs being located intermediate adjacent flutes, here again taking advantage of the maximum diameters of the components to accommodate what would otherwise be the weakening female coupling recesses.

Figure 5:
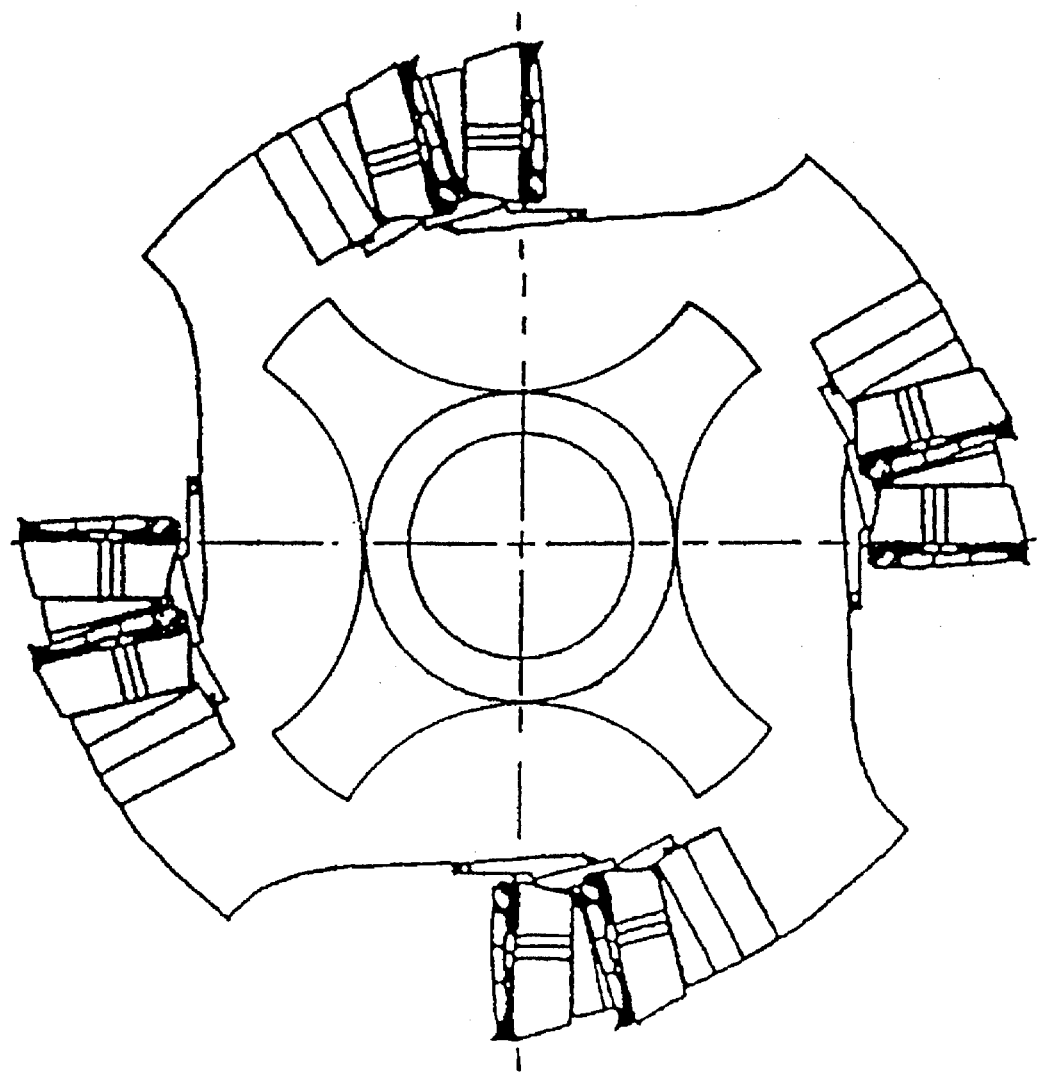
FIG. 5 is a plan view from below of a second modified form of constituent component for a rotary tool assembly in accordance with the present invention.

Furthermore, whilst in the arrangements shown in FIGS. 1, 2, 3 and 4 of the drawings the male and female coupling components are shown as being of generally triangular shape, having three sets of mating lobe portions, it will be appreciated that the invention is equally applicable to a situation where the mating coupling portions are provided with other numbers of mating terminal lobes such as, for example, a situation wherein both the male and female coupling portions are provided with a single pair of oppositely-directed terminal lobes or, alternatively, as shown in FIG. 5 of the drawings, a cross-like arrangement wherein four radial arms for both the male and female portions have terminal lobe portions at the end of each Furthermore, whilst in the arrangement specifically described above the points of contact between the male and female coupling components take place at respective pairs of surfaces, both of which are curved, with the one having a lower radius of curvature nesting completely within the surface having the higher radius of curvature, it will be appreciated that only one of the constituent surfaces need be curved, whilst the other one could be planar.

Figure 6:
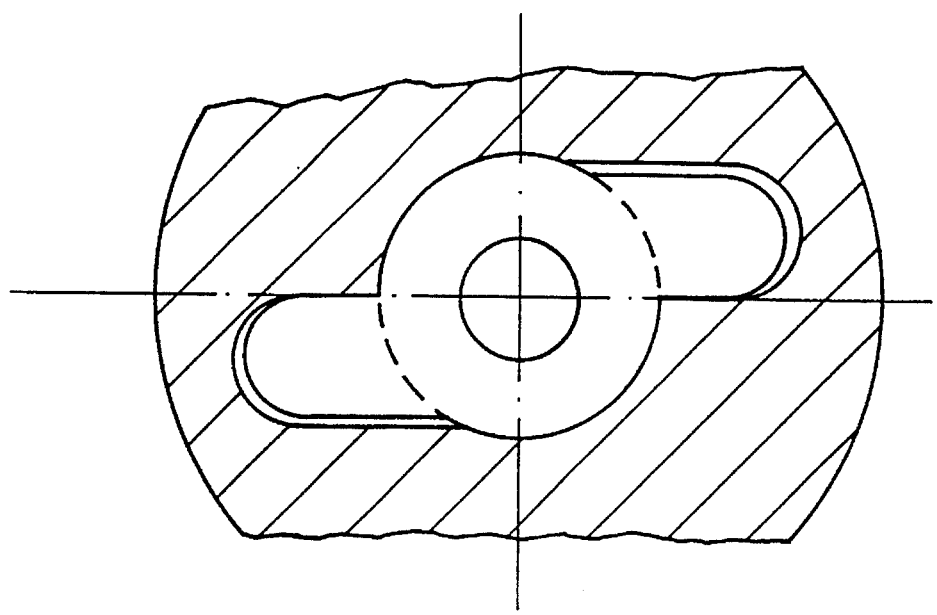
FIG. 6 illustrates an alternate, asymmetrical embodiment of the male and female coupling components.

Furthermore, whilst in the arrangement specifically described the male and female coupling components are symmetrical about their longitudinal axis, this need not necessarily be the case as illustrated in FIG. 6. All that is required is that they have a common axis of rotation. Thus, for example, in the specific example shown in the drawings where the male and female coupling components are constituted by radial arms terminating in terminal lobes, the arms need not necessarily be of equal length.

Whilst in the specific illustrated example the tool assembly is shown as being provided with helically-directed flutes, the invention is equally applicable to assemblies wherein such flutes are not provided. Similarly, the invention is also applicable where the tool assembly is stationary and is, for example, used in turning operations.

The provision of the aligning component which depends from the torque transmission component is, as the name indicates, specifically for aligning purposes. It will be appreciated, however, that under certain circumstances this aligning component can be dispensed with and aligning is effected by means of the clamping screw alone and the mating of the male and female torque-transmitting coupling components.

Figure 7:
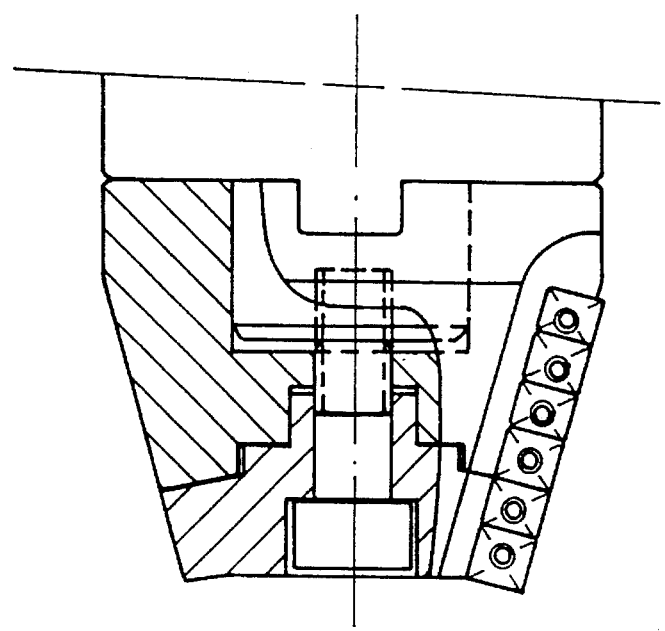
FIG. 7 illustrates an alternate, conical embodiment of the tool holder components.

It will furthermore be appreciated that the invention is equally applicable to rotary or stationary tool assemblies having non-cylindrical, e.g. conical, tool holding components, i.e. where the milling cutters define a conical envelope as shown in FIG 7.

Finally, whilst the invention has been specifically described for use with a tool component cutting assembly, the invention is equally applicable where three or more components have to be coaxially coupled, such as, for example, to extend the length of the cutting assembly where this may be required. In each case, each component can be provided with torque-transmitting coupling means substantially similar to those described above with respect to the tool component system.

We claim:

1. A rotary cutting tool assembly having a rotary axis and comprising first and second tool assembly components adapted to be coaxially coupled together by means of a clamping screw and so that a drive transmitted to said first component is transmitted to said second component, at least one of the tool assembly components being provided with peripherally disposed flutes;

the components being formed with interfitting male and female coupling members, each coupling member being formed with at least two terminal lobe portions directed into peripheral areas located between said flutes and a central, symmetrically disposed portion which is inset with respect to the associated lobe portions, the central and lobe portions of the male coupling member mating within the central portion and lobe portions of the female coupling member;

each pair of mating lobe portions of the coupling members having a respective pair of surfaces at least one of which is curved so that, upon relative rotational displacement of said components about said rotary axis, a point of contact is established between at least one pair of said surfaces at an area thereof remote from said central portion and so that an angle defined between a tangent to said curved surface at said point of contact and a radius extending from said rotary axis to said point of contact lies substantially between −10° and +25°.

2. A rotary cutting tool assembly according to claim 1, wherein each component surface of said pair of surfaces is curved, nesting one within the other and having differing radii of curvature.

3. A rotary cutting tool assembly according to claim 1, wherein one of said component surfaces is curved whilst the other component surface is planar.

4. A rotary cutting tool assembly according to claim 1, wherein said coupling members are symmetrically formed about their common axis.

5. A rotary cutting tool assembly according to claim 1, wherein said coupling members are asymmetrically formed with respect to the common axis.

6. A rotary cutting tool assembly according to claim 1, wherein each coupling member comprises a plurality of substantially radially-directed arms, each arm being formed integrally at one end thereof with one of said terminal lobe portions and at the other end there of with said central portion.

7. A rotary cutting tool assembly according to claim 1, wherein said coupling members are formed with additional alignment means for coaxially aligning the first component with respect to the second component.

8. A rotary cutting tool assembly according to claim 1 and having tool cutting elements mounted thereon so as to define a cylindrical envelope.

9. A rotary cutting tool assembly according to claim 1 and having tool cutting elements mounted thereon so as to define a conical envelope.

10. A rotary cutting tool assembly according to claim 1, wherein said angle lies substantially between 0° and 1°.

* * * * *